United States Patent Office  3,469,410
Patented Sept. 30, 1969

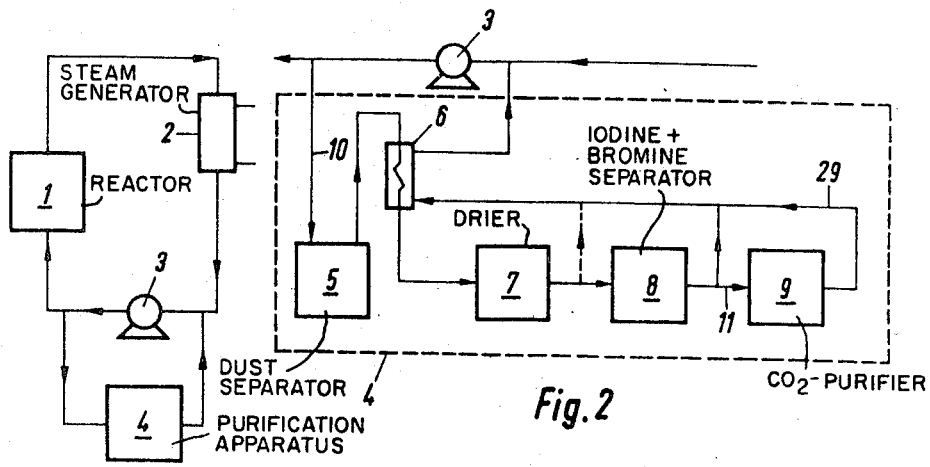
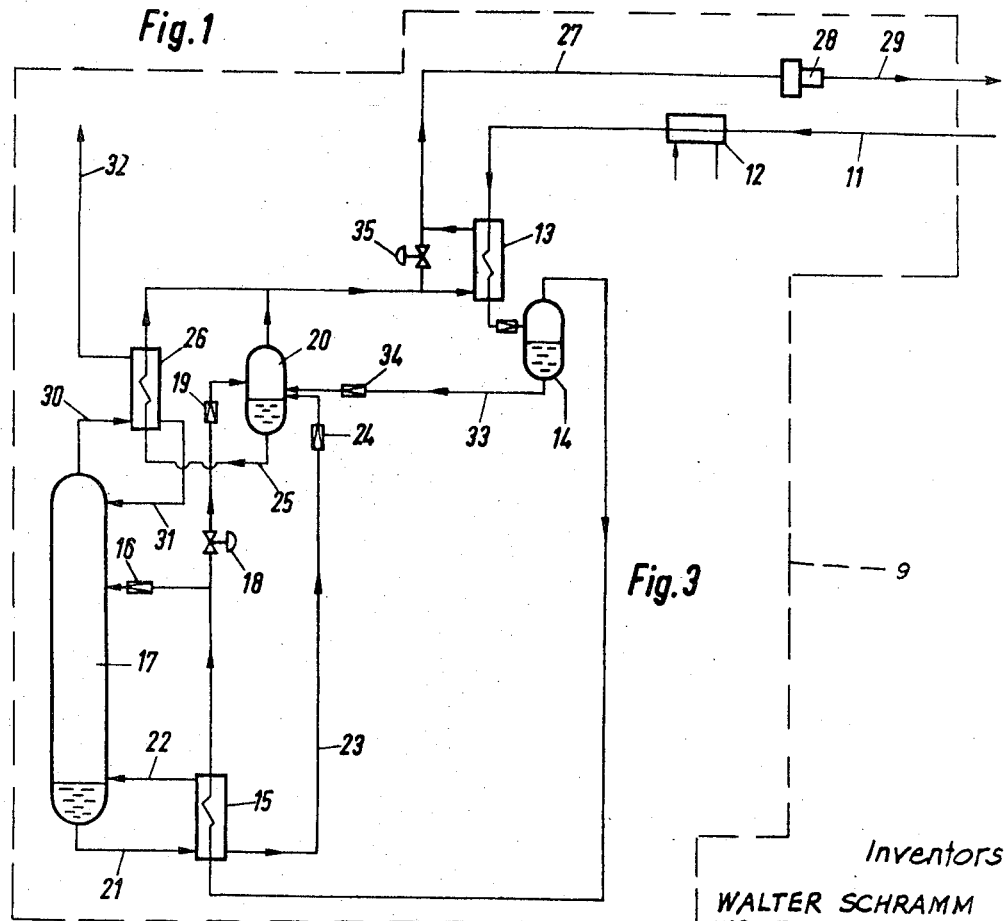

3,469,410
PROCESS AND APPARATUS FOR THE REMOVAL OF TRACES OF IMPURITIES FROM CARBON DIOXIDE
Walter Schramm and Wolfgang Baldus, Munich, Germany, assignors to Linde Aktiengesellschaft, Wiesbaden, Germany
Continuation-in-part of application Ser. No. 290,446, June 25, 1963. This application Apr. 14, 1967, Ser. No. 634,025
Claims priority, application Germany, July 4, 1962, G 35,374
Int. Cl. F25 3/02
U.S. Cl. 62—28       10 Claims

ABSTRACT OF THE DISCLOSURE

Impurities contained in carbon dioxide heat transfer medium, circulating through an atomic reactor, are removed by withdrawing a portion of the impurity containing $CO_2$ from the reactor cycle and liquefying the withdrawn $CO_2$ portion by heat exchange with pure $CO_2$ from distillation column bottoms before separation. A portion of the liquefied $CO_2$ enters the distillation column where impurities are removed overhead and purified $CO_2$ bottoms is recombined with remaining liquefied $CO_2$ and returned to the reactor heat transfer cycle.

Cross reference to related applications

This application is a continuation-in-part of applicants' co-pending application Ser. No. 290,446, filed June 25, 1963, now abandoned.

Background of the invention

This invention relates to a system for the removal of trace impurities from carbon dioxide. It is known that carbon dioxide can be purified by fractional condensation and/or by chemical methods to such an extent that it will be tasteless and odorless, which has heretofore been sufficient to meet the requirements for its ordinary uses, especially in the food industry. The use of carbon dioxide as a cooling fluid for atomic reactors; however, has made it necessary to remove even traces of impurities because these, by reason of their large capture cross sections, cause considerable loss of neutrons and thus lower the reactivity of the reactor.

For this reason the carbon dioxide to be introduced must have the required degree of purity, and care must be taken that the impurities will not exceed a prescribed maximum during use.

Summary of the invention

This invention furnishes an apparatus and process for removing traces of impurities from $CO_2$ by refrigeration to liquefy the $CO_2$ and by separation in a rectification column. The invention has the advantage of being operated with a large excess of refrigeration whereby the heats of disintegration of impurities such as xenon and krypton are quickly compensated. The refrigeration used in this process has a relatively high temperature level and is therefore less expensive to produce than refrigeration having a lower temperature level, such as is necessary in the removal of impurities by adsorption.

It is also especially advantageous that the rectification column required for this process is of unusually small dimensions and can therefore readily be built into a reactor installation itself.

In accordance with this invention, the gas to be purified is first cooled by heat exchange with gas leaving the purification system. The gas then may be condensed by further heat exchange with gas evaporating from the sump of the rectification column of the invention. The condensate may then be divided into a first fraction from which the impurities are to be separated and a second fraction, preferably of smaller size, which serves for refrigeration production and heat transfer.

It is an object of this invention to provide a system including a novel method and apparatus, by which traces of impurities can be removed from carbon dioxide.

Upon further study of the specification and claims, other objects and advantages of the present invention will become apparent.

This problem can be solved by subjecting the carbon dioxide to a rectification process in which the carbon dioxide that is to be purified is put into service both as a circulating medium for the production of refrigeration, and as a heat transfer medium for processing the carbon dioxide during purification.

Brief description of the drawings

FIGURE 1 is a simplified schematic diagram of a reactor using carbon dioxide as the heat transfer medium;
FIGURE 2 is a simplified schematic diagram of an integrated $CO_2$ purification system;
FIGURE 3 is a detailed schematic diagram of the trace-impurity section according to this invention.

Description of the preferred embodiments

Figure 4:
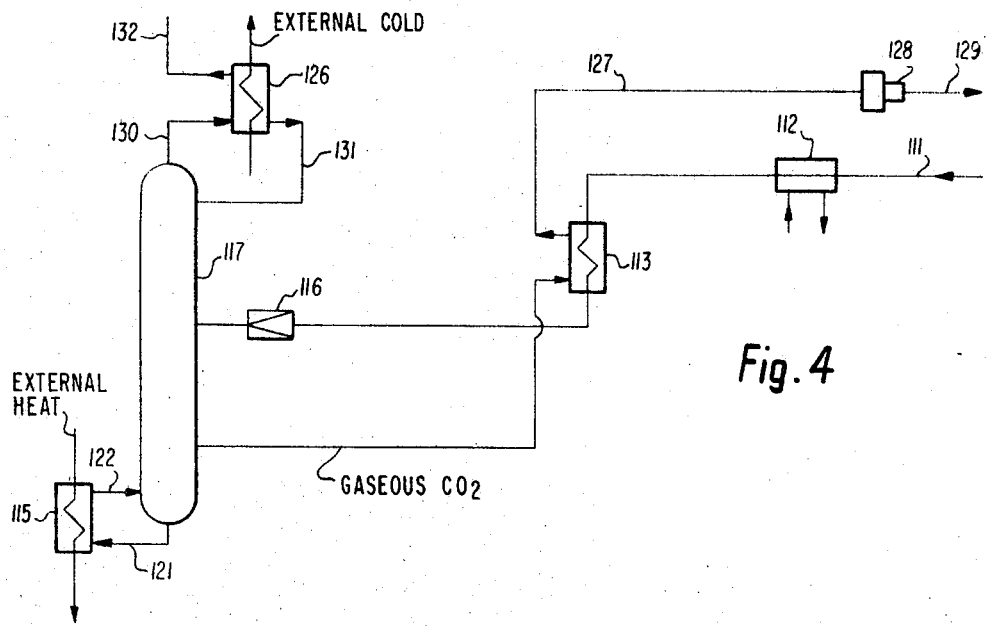
FIGURE 4 is a view similar to FIGURE 3 showing a variation in accordance with the invention.

By the process of this invention it is possible to remove traces of impurities down to the required level. The impurities most frequently encountered are the carbon monoxide and methane produced in the reactor. It is also possible that air may enter by leakage, and argon, hydrogen, hydrocarbons, and also kryton and xenon may get into the cooling circulation if the cover members for the fuel elements have imperfections. All of these impurities, with the exception of xenon, can be easily removed from the carbon dioxide in a single step. Additionally, xenon can be separated if it occurs in a low concentration, and if the reflux in the rectification column is sufficiently increased.

According to one embodiment of the invention, the purification of reactor gases, for which the following process is especially applicable, a portion of the circulating gas, preferably about 1.0 to 10.0% is diverted and is first freed from water, iodine and bromine by adsorption, whereupon a portion, preferably about 0.5 to 5.0% of this prepurified gas is freed from all the remaining impurities in the apparatus of this invention. For this purpose the latter portion of the carbon dioxide is cooled by heat exchange with the gas that leaves the purification system; and then it is condensed by further heat exchange with material evaporating from the sump of the rectification column. The condensate is then divided into a first fraction, preferably about 50 to 80%, from which the impurities are to be separated and which is to be passed through an expansion valve into the middle portion of the rectification column, and a second fraction, preferably of smaller size, which serves for refrigeration production and heat transfer.

This second fraction is expanded by throttling preferably, in a separator, in which is also expanded any liquid from the sump which was not vaporized by heat exchange with the carbon dioxide to be purified, preferably about 30% to 60% of the sump liquid. The liquid which collects in this separator is used for cooling the head of the rectification column, preferably by being vaporized in countercurrent relation to a gaseous mixture taken from the head of the column. This gaseous mixture from the column head is then condensed and refluxed to the column. The noncondensed portion contains the impurities and is removed from the installation.

The rectification can be regulated in such a manner that the distillate consists entirely of impurities. It is, however, advisable to let some $CO_2$ escape with this portion, the ratio of $CO_2$ to impurities being preferably about 9:1. The loss of carbon dioxide thus incurred is nevertheless minor because the impurities constitute an extremely small percentage of the total amount of gas, preferably about 0.2 to 1.0%. On the other hand, this process offers the advantage of requiring only a small expenditure of energy because only a small temperature difference of about 3 to 15° C. is required between the head and the sump of the column.

The liquid product taken from the separator, consisting partly of purified, preferably about 50 to 80% and partly of non-purified gases, is vaporized and after further heat exchange is conducted away from the purification apparatus and returned to the heat transfer cycle of the reactor.

The apparatus, according to one embodiment, is preferably so designed that it will produce an excess of refrigeration which, during normal operation, will be removed from the apparatus through a bypass around a heat exchanger which would otherwise transfer the refrigeration from the purified gases to the crude gas.

For shortening the time that is required for bringing this apparatus into operation and to compensate for insufficient refrigeration in the rectification column, the refrigeration that has been produced can be returned to the apparatus by closing the above-mentioned bypass.

According to a further development of this embodiment, provision is made for the accumulation of liquid in a second separator. This liquid is derived by heat exchange of the purified gas with the gases to be purified; the resultant condensed impure liquid is then expanded and delivered to the first-mentioned separator. By this method it is possible to add refrigeration to the head of the rectification column at any time when more refrigeration is needed.

Without further elaboration, it is believed that one skilled in the art can use this invention to its fullest extent. The following preferred embodiments of this invention are presented merely for the purposes of illustration and are not to be construed as limiting the invention as described in the preceding description and in the claims, in any way whatsoever.

Referring to the drawings, in FIGURE 1 the reactor itself is designated as 1 whereas 2 is the steam generator. The carbon dioxide which leaves the reactor has a temperature of about 240° C. and a pressure of about 53 atm. It is compressed by blower 3 to about 60 atm. whereby the temperature of the gas is increased to about 252° C. The purification apparatus 4 is in a parallel circuit.

As FIGURE 2 shows, the purification apparatus 4 comprises a dust separator 5, a heat exchanger 6, a drier 7, an iodine and bromine separator 8, and the final carbon dioxide purifier 9 of this invention which eliminates the residual trace impurities.

The first embodiment of the purification apparatus 9 is shown in detail in FIGURE 3.

With for example, 1.5 million Nm.³/h. carbon dioxide being circulated through a 100 mw. nuclear reactor by the blower 3, about 30,000 Nm.³/h. of this gas are diverted by conduit 10 (see FIGURE 2) to the purification circuit. Nm.³/h., throughout the specification, means cubic meters per hour at normal conditions. These 30,-000 Nm.³/h. are given a preliminary cleaning in stations 5, 7 and 8 (it being possible to combine 7 and 8 into a single station). From this diverted gas, about 210 Nm.³/h. are separated and sent through pipe 11 (FIGURE 3) under about 54 atm. pressure through a water cooled heat exchanger 12, the purpose of which is to keep the temperature of the gas that is to be purified constant and ordinarily at 30° C. The gas is then further cooled in a heat exchanger 13 to about 21° C. and from there is passed through a first separator 14 and then through a heat exchanger 15 in which it is cooled to about 16.5° C. while being liquefied. About 133 Nm.³/h. of this liquid impure carbon dioxide are then sent through an expansion valve 16 into the middle portion of the rectification column 17 which is operating under a pressure of about 50 atm. The remainder of the approximately 77 Nm.³/h. carbon dioxide is expanded by the regulating valve 18 and the throttle valve 19 for delivery to the second separator 20 under about 42.5 atm. pressure. The liquid in the sump of the rectification column, which consists of pure carbon dioxide, is conducted by pipe 21 to the heat exchanger 15 where much of it is vaporized and again returned through pipe 22 to the rectification column slightly above the sump liquid. The portion that is not vaporized is sent through pipe 23 and valve 24 to be expanded into the separator 20. The liquid mixture of purified and unpurified carbon dioxide which has collected in the bottom of the separator 20 at a temperature of about 7° C. is delivered by pipe 25 to the heat exchanger 26 in which it is vaporized and then warmed to about 20° C. in the heat exchanger 13. About 206 Nm.³/h. carbon dioxide are delivered from this exchanger by conduit 27 to the compressor 28 for compression to the original pressure of 54 atm. before being returned by pipe 29 (FIGURES 3 and 2) to the reactor.

From the head of the rectification column 17 a mixture of impurities consisting especially of carbon monoxide, methane, oxygen, nitrogen, argon, helium, krypton and xenon, together with some carbon dioxide, are delivered by conduit 30 to the heat exchanger 26 for partial liquefaction. The liquefied portion, which consists mainly of carbon dioxide, is returned by pipe 31 to the head of the rectification column while the gaseous portion, about 4 Nm.³/h., which besides about 90% carbon dioxide also contains the impurities, is conducted away by a conduit 32 under a pressure of about 50 atm. and a temperature of about 10° C. The refrigeration energy of this gaseous portion can, if desired, be recovered by another heat exchanger for reuse by the purification apparatus.

For cooling the apparatus the bypass valve 35 is closed. This will cause some of the impure gas from the pipe 11 to be liquified in the heat exchanger 13. The resulting liquid is collected in the separator 14 from where it is removed by pipe 33 for passage through expansion valve 34 and into the separator 20. During normal operation the temperature of the gas which leaves the purifying apparatus can be controlled by means of the regulating valve 35.

Obviously, the cooling required for the heat exchanger 26 or the heating required for the heat exchanger 15 may be supplied from an external source, if so desired, in lieu of the use of the internal system as has been described above.

Turning now to FIGURE 4 of the drawings, a modification of the above-described system is illustrated wherein both of the above-mentioned heat exchangers are heated and cooled, as required, from external sources. Components of the embodiment of FIGURE 4 corresponding to those of FIGURE 3 are indicated by like numerals of the next higher order. In the process according to FIGURE 4, 133 Nm.³/h. of impure $CO_2$ are fed into a rectification column 117 through a conduit 111. This is the identical amount of $CO_2$ that is fed into the equivalent column 17 through the valve 16 of FIGURE 3. In the embodiment of FIGURE 4, the incoming impure $CO_2$ is first cooled with water in the heat exchanger 112 and then, in countercurrent heat exchange, with pure gaseous $CO_2$ from the column 117 in the heat exchanger 113. Cooling of the head of the rectification column 117 is effected by means of external cooling applied through the heat exchanger 126 while the sump is heated by means of external heat applied through the heat exchanger 115. The operation of the remaining components shown in the embodiment of FIGURE 4 is identical to that of the corresponding components of the embodiment of FIGURE 3.

Figure 5:
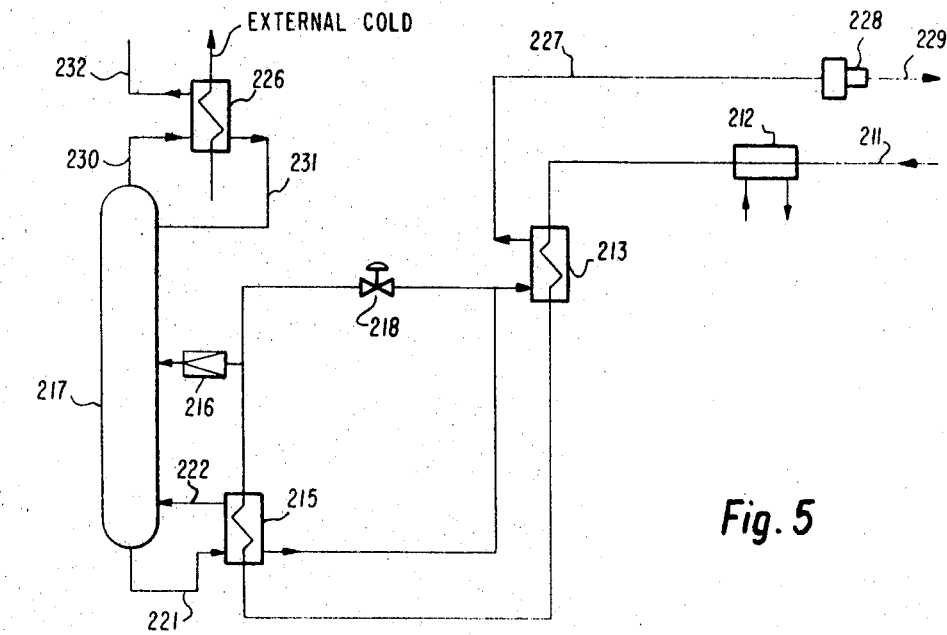
FIGURE 5 is a view similar to FIGURE 4 showing another variation in accordance with the invention.

The embodiment of FIGURE 5 differs from that of FIGURE 4 in that heat for the sump of the rectification column 217 is, as in the embodiment of FIGURE 3, provided by the system rather than by an external source. Again, in FIGURE 5, components thereof corresponding to like components of the preceding figures are indicated by like numerals of the next higher order. As in FIGURE 3, the impure $CO_2$, after cooling in the heat exchangers 212 and 213, is directed through the heat exchanger 215 to heat liquid $CO_2$ circulating from the sump of the column 217 through the conduits 221 and 222. For example, 210 Nm.³/h. impure $CO_2$ enters the plant through the conduit 211. In contrast to the embodiment of FIGURE 4, the pure $CO_2$ drawn off from the column through the conduit 221 is divided into two streams. The first, a gaseous steam, is fed back into the rectification column 217 through the conduit 222, while the second, in liquid form, is recombined with the unrectified portion of the $CO_2$ flowing through the valve 218 to serve to recool the impure $CO_2$ in the heat exchanger 213. The portion of $CO_2$ to be rectified in the column 217 amounts to 133 Nm.³/h., which is equal to the rectified amount of $CO_2$ in the embodiment of FIGURE 3. The remaining 77 Nm.³/h. is used only for cooling purposes in the heat exchanger 215. The head of the column 217 is cooled from an external source through the heat exchanger 226. The process in accordance with the embodiment of FIGURE 5 is especially suitable if the impure $CO_2$ entering the system has a temperature substantially above room temperature. By making use of the described cooling cycle for the impure $CO_2$, in certain cases it is not only possible to save cooling water in the heat exchanger 212, but in certain situations it is also possible to avoid the use of such heat exchanger altogether From what has been set forth above, it is obvious that various combinations of components other than those specifically described above may be utilized within the scope of the invention as taught. For example, the internal cooling system of the embodiment of FIGURE 3 may be used in lieu of the external cooling system of the embodiments of FIGURES 4 and 5 for the heat exchangers 126 and 226 respectively, while the heat exchanger 115 of FIGURE 4 is supplied with heat from an external source.

This invention is not limited to the purification of carbon dioxide for use in reactors, but is applicable to the purification of carbon dioxide for any purpose. Preferably, the distillation purification system of this invention is operated at about 10–60 atm.

The percentages and pressures mentioned in the description are, by volume, and absolute, respectively.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A method for removing trace impurities from gaseous $CO_2$ which comprises liquefying the $CO_2$ and rectifying at least a portion of the resulting liquid into two fractions, a gaseous fraction which consists of $CO_2$ and all of the impurities and a liquid fraction which consists of highly purified $CO_2$, withdrawing at least a portion of the highly purified $CO_2$, and passing said withdrawn portion of the highly purified $CO_2$ in indirect heat exchange with the gaseous $CO_2$ to liquefy the $CO_2$ prior to rectification.

2. The method of claim 1 wherein the liquefied $CO_2$ is divided into first and second portions, the first portion of the resulting liquid being rectified into a liquid fraction and a gaseous fraction, and wherein the liquid fraction is subsequently combined with the second portion of the $CO_2$.

3. The method of claim 2 wherein the rectification step comprises passing a major portion of the liquefied $CO_2$ to the middle section of a rectification column, expanding the remaining minor portion of said liquefied $CO_2$, expanding pure liquid $CO_2$ from the sump of the rectification column, combining both of the two expanded liquid streams, and passing the combined liquid streams in indirect heat transfer relationship with the vapor, thereby condensing $CO_2$, and refluxing the condensed overhead $CO_2$ to the top of the column.

4. In a method of cooling an atomic reactor with a $CO_2$ heat transfer medium which contains trace impurities selected from the group consisting of H, CO, $O_2$, $N_2$, hydrocarbons, argon, krypton, xenon, and mixtures thereof, the improvement which comprises: withdrawing a portion of said $CO_2$ from the reactor heat transfer cycle and liquefying the same, separating liquefied fraction into a first and second stream, said first stream being distilled in a distillation column to remove the impurities and obtain a purified $CO_2$ stream, removing the purified $CO_2$ from the distillation column, and combining it with said second stream, and returning the combined $CO_2$ streams to the reactor heat transfer cycle.

5. The method of claim 4 wherein the distillation step comprises separating the liquid fraction into a first and second stream, a major portion of said liquefied fraction being in the first stream, and a minor portion being in the second stream, passing said first stream to the middle section of a distillation column, expanding pure liquid from the sump of the distillation column, expanding said second stream, combining resultant two expanded liquid streams, and passing resultant combined liquid streams in indirect heat transfer relationship with impure overhead vapor from the top of the distillation column to condense $CO_2$, and refluxing the condensed overhead $CO_2$ to the top of the column.

6. The method of claim 5 wherein impurities distilled from the distillation column are removed with $CO_2$ at a ratio of about 1:9.

7. Apparatus for removing trace impurities from carbon dioxide, which apparatus comprises first and second indirect heat exchange means, each of said means having a first flow cross section and a second flow cross section;
   first expansion means connected to the first flow cross section of one of said heat exchange means;
   a rectification column having a sump, a midsection and a top section, said first expansion means being connected to said mid-section;
   a first conduit means and a second conduit means connected between said sump and the second flow cross section of said second indirect heat exchange means, said first conduit means being connected below the liquid level of the sump and said second conduit means being connected above the liquid level;
   third indirect heat exchange means having first and second flow cross sections;
   a third conduit means and a fourth conduit means connecting the second flow cross section of the third indirect heat exchange means to the top section of the rectification column, and
   a fifth conduit means leading from the second flow cross section of the third indirect heat exchange means for removing the impurities from said third heat exchange means.

8. The apparatus of claim 7 wherein said first and second indirect heat exchange means are connected in series by their first flow cross sections;

said first expansion means being connected to the first flow cross section of said second indirect heat exchange means.

9. The apparatus of claim 8 further comprising a second expansion means connected to the first flow cross section of said second indirect heat exchange means;

separating means having an upper portion for gas and a lower portion for liquid, said means being connected to said second expansion means;

third expansion means connected between the second flow cross section of the second indirect heat exchange means and the separating means;

the first flow cross section of said third indirect heat exchange means being connected to the lower portion of said separating means; and a sixth conduit means connecting the upper portion of said separating means and the second flow cross section of the first indirect heat exchange means.

10. The apparatus of claim 9, further comprising a second separating means having an upper portion and a lower portion, said second separating means being positioned between the first and second indirect heat exchange means, fourth expansion means connected to the lower portion of said second separating means, said fourth expansion means being also connected to the first separating means, thereby forming communication between said first and second separating means.

References Cited

UNITED STATES PATENTS

| | | | |
|---|---|---|---|
| 2,551,399 | 5/1951 | Silverberg | 62—10 XR |
| 2,743,590 | 5/1956 | Grunberg | 62—28 |
| 2,583,090 | 1/1952 | Cost | 62—27 XR |
| 2,585,288 | 2/1952 | Van Nuys | 62—10 XR |
| 2,627,731 | 2/1953 | Benedict | 62—31 XR |
| 2,650,482 | 9/1953 | Lobo | 62—29 XR |
| 2,842,941 | 7/1958 | Eickmeyer | 62—10 XR |
| 3,105,028 | 9/1963 | Long | 176—37 |
| 3,196,621 | 7/1965 | Becker | 62—29 XR |

FOREIGN PATENTS 591,383    1/1960    Canada.

NORMAN YUDKOFF, Primary Examiner

V. W. PRETKA, Assistant Examiner

U.S. Cl. X.R.

62—10, 26, 31, 36; 176—37